US011582554B1

United States Patent
Puskarich et al.

(10) Patent No.: US 11,582,554 B1
(45) Date of Patent: Feb. 14, 2023

(54) HOME SOACALIZATION AND IDENTIFICATION

(71) Applicant: Apple Inc., Cupertino, CA (US)

(72) Inventors: Paul G. Puskarich, London (GB); Fiona P. O'Leary, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/211,582

(22) Filed: Mar. 24, 2021

Related U.S. Application Data (60) Provisional application No. 63/081,819, filed on Sep. 22, 2020.

(51) Int. Cl.
| | | |
|---|---|---|
| *H04R 3/00* | (2006.01) | |
| *H04R 1/40* | (2006.01) | |
| *G10L 25/51* | (2013.01) | |
| *H04R 1/04* | (2006.01) | |
| *H04R 29/00* | (2006.01) | |
| *G08B 21/18* | (2006.01) | |

(52) U.S. Cl.
CPC ............. *H04R 3/005* (2013.01); *G10L 25/51* (2013.01); *H04R 1/04* (2013.01); *H04R 1/406* (2013.01); *H04R 29/005* (2013.01); *G08B 21/182* (2013.01); *H04R 2420/07* (2013.01)

(58) Field of Classification Search
CPC .......... H04R 3/005; H04R 1/04; H04R 1/406; H04R 29/005; H04R 2420/07; G10L 25/51; G08B 21/182
USPC ....................... 381/56, 58, 92, 105, 122, 124
See application file for complete search history.

(56) References Cited

U.S. PATENT DOCUMENTS

| | | | |
|---|---|---|---|
| 9,430,931 B1* | 8/2016 | Liu ..................... | G08B 21/24 |
| 2016/0309279 A1* | 10/2016 | Kim .................... | H04S 7/303 |
| 2019/0115045 A1* | 4/2019 | Jarvis .................. | G10L 25/03 |
| 2021/0104992 A1* | 4/2021 | Cooper ................ | H03G 5/165 |

OTHER PUBLICATIONS

Adavanne, S. et al., "Sound Event Localization and Detection of Overlapping Sources Using Convolutional Recurrent Neural Networks", Journal of Selected Topics in Signal Processing, arXiv:1807.00129v3 [cs.SD], Dec. 17, 2018.
Cao, Y. et al., "Polyphonic Sound Event Detection and Localization Using a Two-Stage Strategy", Detection and Classification of Acoustic Scenes and Events, arXiv:1905.00268v4 [cs.SD], New York, NY, USA, Nov. 5, 2019.
Cobos, M. et al., "A Survey of Sound Source Localization Methods in Wireless Acoustic Sensor Networks", Hindawi, Wireless Communications and Mobile Computing, vol. 2017, Article ID 3956282, https://doi.org/10.1155/2017/3956282, Aug. 17, 2017.

* cited by examiner

*Primary Examiner* — William A Jerez Lora
(74) *Attorney, Agent, or Firm* — Dorsey & Whitney LLP (57) ABSTRACT

A system for sound localization can include a first electronic device having a microphone to detect a sound, and a second electronic device. A processor can be in communication with the first electronic device and the second electronic device. The processor can receive a first signal from the first electronic device corresponding to the detected sound, determine a location of origin of the detected sound based at least in part on the first signal, and provide a second signal to the second electronic device based at least in part on the location of origin.

20 Claims, 8 Drawing Sheets

HOME SOUND LOACALIZATION AND IDENTIFICATION

CROSS-REFERENCE TO RELATED APPLICATION(S)

This claims priority to U.S. Provisional Patent Application No. 63/081,819, filed 22 Sep. 2020, and entitled "HOME SOUND LOCALIZATION & IDENTIFICATION," the entire disclosure of which is hereby incorporated by reference.

FIELD

The described embodiments relate generally to sound localization. More particularly, the present embodiments relate to electronic devices and systems for locating and identifying sounds.

BACKGROUND

Recent advances in portable computing have allowed electronic devices to take a variety of form factors and include a variety of components and sensors, including audio sensors such as microphones. Further, the availability of these devices has allowed them to become ubiquitous in our lives and homes, and to perform a variety of useful functions. While devices can have high levels of computing power and can collect and access information about their surroundings and environment, current devices may not be able to utilize this computing power and information to provide solutions to many problems and questions a user may experience in day-to-day life. Therefore, a need exists to use the capabilities and ubiquity of electronic devices in new ways to solve heretofore unaddressed everyday problems.

SUMMARY

According to some aspects of the present disclosure, a system for sound localization can include a first electronic device including a microphone configured to detect a sound, a second electronic device, and a processor in communication with the first electronic device and the second electronic device, the processor configured to receive a first signal from the first electronic device corresponding to the detected sound, determine a location of origin of the detected sound based at least in part on the first signal, and provide a second signal to the second electronic device based at least in part on the location of origin.

In some examples, the processor can be disposed in an internal volume defined by the first electronic device. The second electronic device can be configured to notify a user upon receiving the second signal from the processor. The second electronic device can include a smartphone, a wearable device, a computer, a tablet, or a smart speaker. The microphone can be a first microphone and the second electronic device can include a second microphone configured to detect the sound, and the processor can be further configured to receive a third signal from the second electronic device corresponding to the detected sound. The system can determine the location of origin based at least in part on the first signal and the third signal. The processor can be configured to determine a characteristic of the detected sound based at least in part on the first signal, and can provide the second signal to the second electronic device if the characteristic satisfies a condition.

According to some aspects, a method for determining one or more properties of a sound can include detecting a sound with an electronic device, determining a location of origin of the sound and a characteristic of the sound, and performing an action based at least in part on the location of origin if the characteristic satisfies a predetermined condition.

In some examples, the electronic device can be a first electronic device and detecting the sound can include detecting the sound with a system that includes the first electronic device and a second electronic device. The location of origin can be a room in a building containing the electronic device. The method can further include determining an expected baseline sound environment, wherein determining the characteristic of the sound can further include comparing the detected sound with the expected baseline sound environment. The characteristic can include a material of origin of the sound. The condition can include whether the material of origin is on a list of expected materials of origin. The characteristic can include an object of origin of the sound. The characteristic can include a volume of the sound and the condition can include whether the volume is above a threshold volume. The action can include notifying a user of the location of origin. The action can include recording the detected sound, the location of origin, and the characteristic.

According to some aspects, an audio system can include a microphone configured to detect a sound, a processor in communication with the microphone and configured to receive a signal from the microphone corresponding to the detected sound, determine a location of origin of the detected sound based at least in part on the signal, and perform an action based at least in part on the location of origin.

In some examples, the microphone and the processor can be disposed in an internal volume of an electronic device. The microphone can be disposed in the internal volume of a first electronic device, the processor can be disposed in the internal volume of a second electronic device, and the processor can be in wireless communication with the microphone. Performing the action can include providing a notification to a user if a detected volume of the sound is above a threshold volume.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In some examples, a system for sound localization, also referred to herein as an audio system, can include one or more electronic devices. The electronic devices can be positioned at various locations in a home, office, or other building or space. In some examples, the electronic devices can include stationary devices that are intended to occupy a single location within the space and/or mobile devices that can be move around the space or carried by one or more users in the space. For example, the system can include a hub device that can be intended to remain on a desk or table, and a mobile device such as a smartphone or watch that can be carried by a user or positioned in different locations in the space. The device or devices can be in communication with a processor. The processor can be located in one or more of the devices, or it can be located off-site and can be in wireless communication with the devices.

In use, one or more of the devices can detect a sound and transmit one or more signals corresponding to the detected sound to the processor. The processor can be configured to determine a physical location of origin of the sound based at least in part on the received signals, as well as additional information that can be collected or received by the system, such as the locations of users or objects in the space, the time of day, and/or calendar events. In some examples, the processor can determine other characteristics of the sound in addition to a location of origin. The system can then perform an action based at least in part on the determined information including location of origin and/or other characteristics of the sound. For example, the system can provide a notification to a user via a smartphone to indicate the location of origin of the sound. In some examples, the location of origin can be classified as a specific room within the space.

In some examples, the system can perform one or more actions if characteristic associated with the sound satisfy one or more conditions. For example, the system can determine the location of origin, the volume, the time of day, and the material or materials of origin of the sound and can perform different actions depending on whether these characteristics satisfy one or more conditions. If the location, volume, time, and/or material of the sound satisfy a first set of conditions, but not a second set of conditions, then the system can provide a notification to the user. If, however, the location, volume, time, and/or material of the sound satisfy the second set of conditions, then the system can sound an alarm and alert the police.

The computing power and environmental sensing capabilities, such as audio sensing capabilities, of many electronic devices can allow for a system including one or more of these devices to provide users with timely and relevant information and answers about everyday occurrences that may otherwise be unanswerable or may not be answerable without undue effort by a user. For example, a user can be home alone in their living room at night when they hear a sound that does not have a readily apparent source. The user can leave the room and attempt to investigate the source of the sound, but may not know whether the sound was caused by an unknown person in the house, an inanimate object, or any number of possible sources. Ultimately, they may be unlikely to determine the source or cause of the sound, and may remain alert and anxious about any number of possible scenarios that might have caused the sound.

In some examples, an audio system described herein can include one or more electronic devices that can detect the sound that is heard by the user. Signals from the devices that correspond to the detected sound can be transmitted to one or more processors which can determine the location of origin of the sound based, at least in part, on the detection signals. The processor or processors can also determine one or more other characteristics of the sound, based at least in part, on the signals, as well as any other information that the devices and/or processors have access to. Thus, rather than having to go investigate the source of the unknown sound and potentially remaining unsure or anxious about any number of possible origins, in some examples the user can be notified of the location of origin of the sound, as well as additional characteristics of the sound. For example, the system can notify the user that the detected sound originated in the kitchen and was likely due to a can falling down in a cabinet.

Thus, in some examples, a system for sound localization or an audio system as described herein can determine a location of origin of a detected sound and can convey that information to a user in any number of ways. For example, the location can be classified as inside or outside a space such as a house, in a particular room in a house, in a particular area of a particular room in a house, and/or more generally, as originating in a particular direction relative to one or more users. The system can also provide information to a user such as whether the sound was likely to have originated from something falling or breaking, whether the sound was likely to have been caused by an inanimate object, a human, or an animal, the material or materials that likely caused the sound, and even a specific object or objects that may have caused the sound.

In some examples, the system can use one or more machine learning algorithms to determine any of the characteristics of a detected sound or sounds, as described herein. Further, in some examples, the system can distinguish between expected sounds in a particular space or environment, such as a home, and unexpected sounds. In some examples, the system can determine or learn a baseline sound environment of a space. The system can then perform an action based on a detected sound if the detected sound deviates from a predicted or expected baseline sound environment. Any amount of information can be used to determine this baseline sound environment, including locations of users, time of day, calendar events, the physical layout of the space, and/or any objects in the space and their characteristics. Accordingly, in some examples, the systems and methods for sound localization described herein can utilize information accessible or collected by one or more electronic devices of the system to provide users with timely and valuable information about the user's surroundings that may not be discoverable by the user without undue effort, or even at all.

These and other embodiments are discussed below with reference to FIGS. 1-7. However, those skilled in the art will readily appreciate that the detailed description given herein with respect to these Figures is for explanatory purposes only and should not be construed as limiting. Furthermore, as used herein, a system, a method, an article, a component, a feature, or a sub-feature comprising at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 1A:
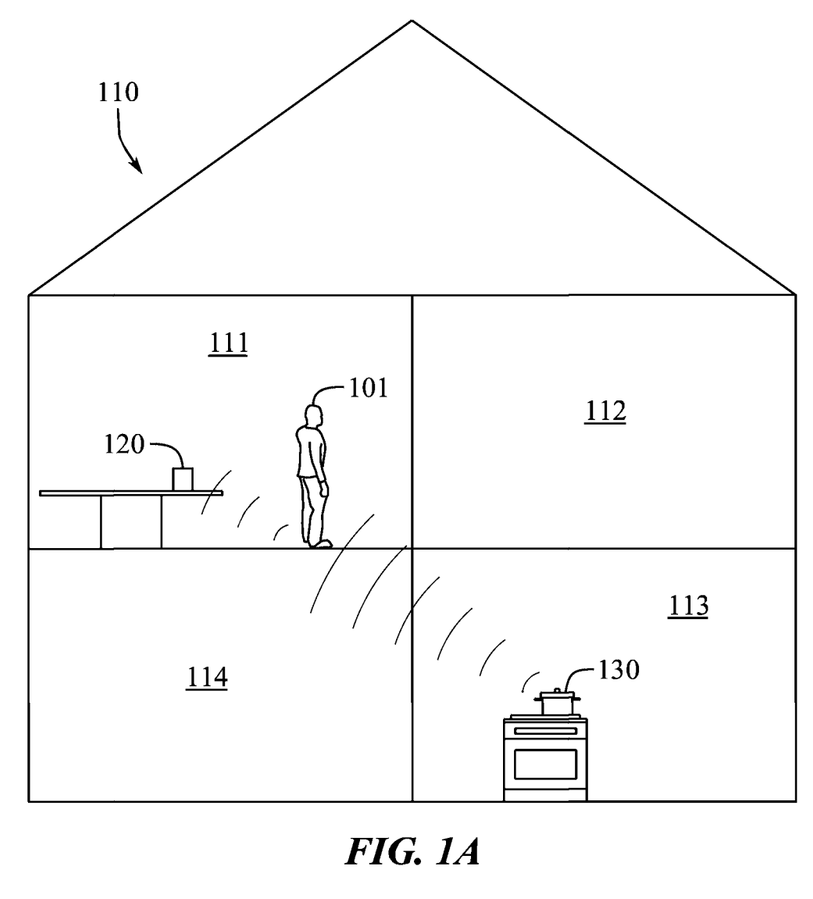
FIG. 1A shows a cross-sectional schematic view of a house including a system for sound localization.

FIG. 1A shows a cross-sectional schematic view of a space, a building, a domicile, or a house 110 including a system for sound localization disposed therein. In the present example, the system includes an electronic device 120 that can be positioned in a location or a room of the house 110, such as an office 111. The house 110 can include multiple other rooms, such as a bedroom 112, a kitchen 113, and/or a living room 114. In some examples, the electronic device 120 can be positioned in substantially any desired location or room of the house 110, and can be moved between locations or rooms, as desired. In some examples, however, a user 101 can be likely to remain in a single room or location during use or during a specified time.

In some examples, the device 120 can include substantially any form or combination of electronic device(s), such as a media player, a media storage device, a portable digital assistant ("PDA"), a tablet computer, a desktop computer, a mobile communication device, a GPS unit, a remote-control device, a smart speaker, a smart television, a smart appliance, a smart watch, or other electronic devices. The electronic device 100 can be referred to as an electronic device, a device, or a consumer device. In some examples, the device 120 can include one or more microphones and/or other audio sensors. The device 100 can also include one or more processors in communication with the microphone, as described herein. In some examples, the device 100 can be in wired or wireless communication with one or more processors contained in one or more other devices or locations. For example, the device 100 can include a Wi-Fi antenna, a cellular antenna, and/or a Bluetooth antenna to communicate with a processor. In some examples, the device 100 can communicate with a processor and/or other devices through a network, such as the Internet and/or a local area network (LAN).

The system for sound localization including at least the electronic device 120 can monitor and/or detect noise or sound in the room 111 and at any location in the house 110, such as the other rooms 112, 113, 114. The processor of the device 120 and/or the processor in communication with the device 120 can execute a machine learning algorithm that can use recorded and/or detected sounds or noise to determine an acoustic signature of the room 111 in which the device 120 is located, as well as the other rooms 112, 113, 114 of the house 110.

In some examples, the system for sound localization can utilize additional information to determine the acoustic signature of the rooms 111, 112, 113, 114 of the house 110. For example, the system can receive or detect information related to the structure, materials, layout, and/or configuration of the rooms 111, 112, 113, 114. The system can also receive and/or detect information related to any objects, users or people, and/or animals, such as pets, that can be located in the house 110. The device 120 can also know, detect, and/or receive information related to its position or location in the house 110 and in the room 111. This information can be received or detected by any desired technique.

For example, the device 120 can include one or more sensors, such as a light detection and ranging (LIDAR) sensor to detect the configuration of the room 111. In some examples, the user 101 can move a LIDAR sensor throughout the rooms 111, 112, 113, 114 of the house 110 to gather information related to the layout of each room and the objects therein. In this way, the system for sound localization can understand or determine how sound propagates throughout the rooms 111, 112, 113, 114 of the house 110. In some examples, the system can utilize one or more machine learning algorithms to understand or determine how sound propagates throughout the rooms 111, 112, 113, 114 of the house 110.

In the scenario illustrated in FIG. 1A, an object 130 in a different location than the user 101, such as a boiling pot 130 located in the kitchen 113 may make a sound, here illustrated with curved lines, that is heard by the user in the office 111. The location of origin and/or source of the sound may not be readily apparent to the user 101. The system for sound localization, including the electronic device 120 including one or more microphones, can also detect the sound caused by the pot 130 and, as described herein, can determine at least the location of origin of the sound, in addition to other characteristics, such as that the sound was likely caused by the lid falling off the pot 130. In some examples, any of the determinations made by the system can be made, at least in part, using a machine learning algorithm.

In some examples, such as when a volume of the sound is determined to be above a threshold, the electronic device 120 can notify the user 101 that the origin of the sound was located in the kitchen 113, thus allowing the user 101 to take any necessary action. In some examples, the user 101 can query or ask the system, such as through the electronic device 120, in order to receive information about the detected sound. In some examples, the user 101 can query the device through touch input, voice input, motion input, or any other form or combination of inputs. In response, the system can notify the user 101 of the location of origin of the sound and/or other characteristics of the sound. For example, the electronic device can provide the information visually, acoustically, through a notification to a smartphone or other personal electronic device, and/or any other combination of methods.

Figure 1B:
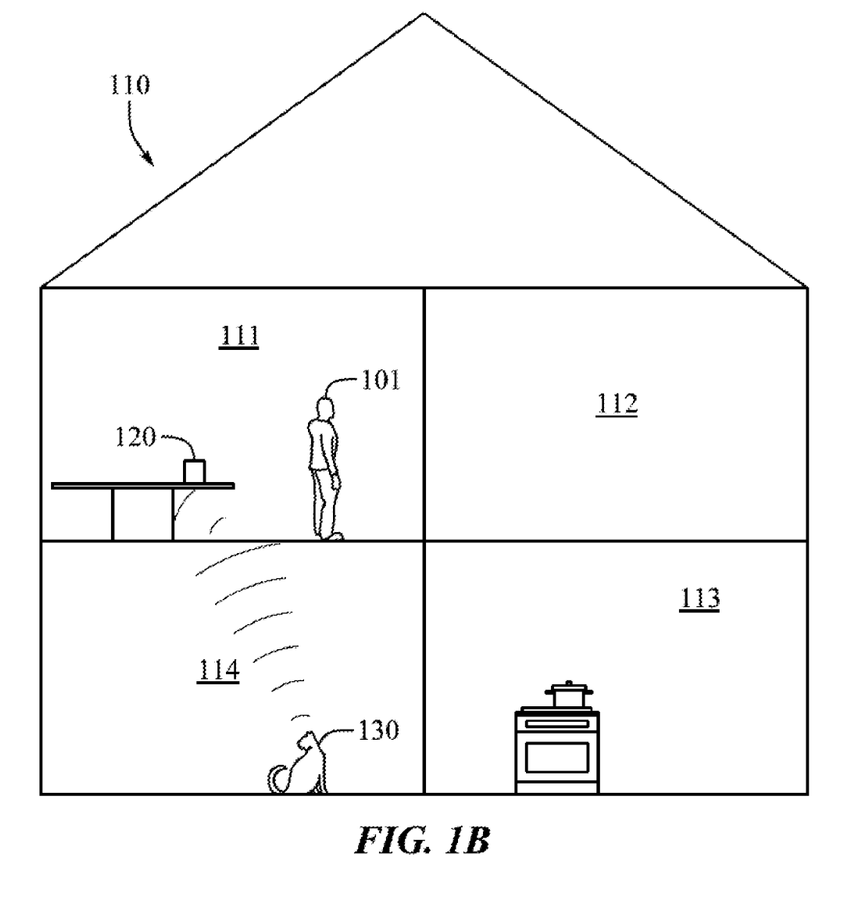
FIG. 1B shows a cross-sectional schematic view of a house including a system for sound localization.

FIG. 1B shows a cross-sectional schematic view of the house 110 illustrated in FIG. 1A including a system for sound localization that includes at least one electronic device 120. In the scenario illustrated in FIG. 1B, the user 101 can be in a room 111, while an unknown sound is generated having a location of origin in a different room 114. In the present example, the sound can be made by a pet, such as cat 130, although this may not be readily apparent to the user 101. As described with respect to FIG. 1A, the system for sound localization can detect the sound, for example through one or more microphones or audio sensors of the electronic device 120, and can determine the location of origin of the sound. In some examples, the system for sound localization can know, understand, and/or have previously received or detected information such as that a cat 130 lives in the house 110. Accordingly, upon detecting the sound, again illustrated with curved lines, the system for sound localization can utilize the knowledge that a cat 130 is typically present in the house 110 to assist in determining the location of origin of the sound as well as the other characteristics of the sound, such as that the sound was cause by the cat 130.

In some examples, and as can be seen in FIGS. 1A and 1B, sounds with different locations of origin will take different paths to reach the audio sensor of the electronic device 120, for example, passing or propagating through, and bouncing off of different materials of the house 110 or in the rooms, 113, 114. The system for sound localization can store and/or receive information regarding material or physical composition of the house 110, and can use this information to assist in determining the location of origin of the sounds 130, for example, with a machine learning algorithm. For example, the sound 130 illustrated in FIG. 1B can have an at least partially unimpeded path towards the electronic device 120 through the stairwell, while the sound 130 illustrated in FIG. 1A may travel almost entirely through the floor of the room 111 to reach the electronic device 120 contained therein. The difference in materials present in the pathways of each sound can be detected by the system for sound localization and can be used to at least partially determine the locations of each sound.

Any number or variety of components or devices in any configuration can be included in the systems for sound localization described herein. The systems, methods, and devices can include any combination of the features described herein, can be arranged in any of the various ways described herein, and can be performed or operated in any order, with some or all of any process steps carried out sequentially or in parallel. The structure, devices, steps, and processes of the systems and methods for sound localization described herein, as well as the concepts regarding characterization of sounds, can apply not only to the specific examples discussed herein, but to any number of embodiments in any combination. Various examples of systems for sound localization and/or characterization are described below, with reference to FIGS. 2A-3B.

Figure 2A:
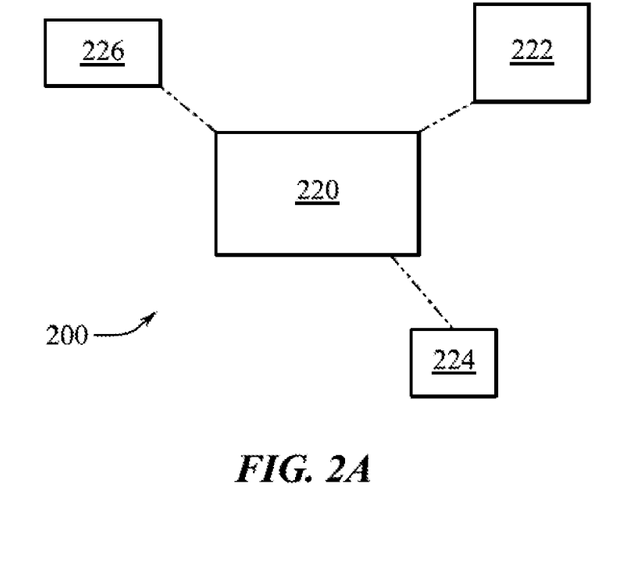
FIG. 2A shows a diagrammatic view of a system for sound localization.

FIG. 2A shows a diagrammatic view of a system 200 for sound localization and/or characterization as described herein. In some examples, the system can include a first electronic device 220 that can include a processor and memory that can store instructions for the processor. The electronic device 220 can include one or more audio sensors and/or other environmental sensors, although in some examples, the device 220 may not include any sensors. In some examples, the system 200 can include one or more additional electronic devices, such as devices 222, 224, 226 that can be in communication with the first electronic device 220. In some examples, the devices 222, 224, 226 can be in communication with the first electronic device 220, and/or the processor thereof, through any combination of wired or wireless connections, illustrated in FIG. 2A with dashed lines. Although not shown, in some examples, one or more of the device 222, 224, 226 can alternatively or additionally be in communication with one another through any combination of wired or wireless connections.

In some examples, the devices 220, 222, 224, 226 of the system 200 can be in wireless communication with one another. In some examples, the devices 220, 222, 224, 226 can communicate with one another through a wireless network, such as a Wi-Fi network and/or a cellular network. In some examples, the devices 220, 222, 224, 226 can communicate with one another through one or more wireless connections between the devices 220, 222, 224, 226. In some examples, a wireless connection can include a Wi-Fi connection, a Bluetooth connection, an NFC connection, an ultra wideband connection, or any other desired connection or communication protocol. In some examples, one or more of the devices 220, 222, 224, 226 can communicate through a wired connection to any one of the other devices 220, 222, 224, 226 using any form of connection and communication protocol, as desired.

In some examples, the devices 220, 222, 224, 226 of the system 200 can each include at least one microphone or audio sensor, as described herein. In some examples, the devices 222, 224, 226 can locally store, process, and/or analyze audio signals detected by the audio sensor or sensors. In some examples, however, one or more of the devices 222, 224, 226 can transmit audio signals detected by the audio sensors to the first electronic device 220 for storage, processing, analysis, and/or any of the operations described herein.

Figure 2B:
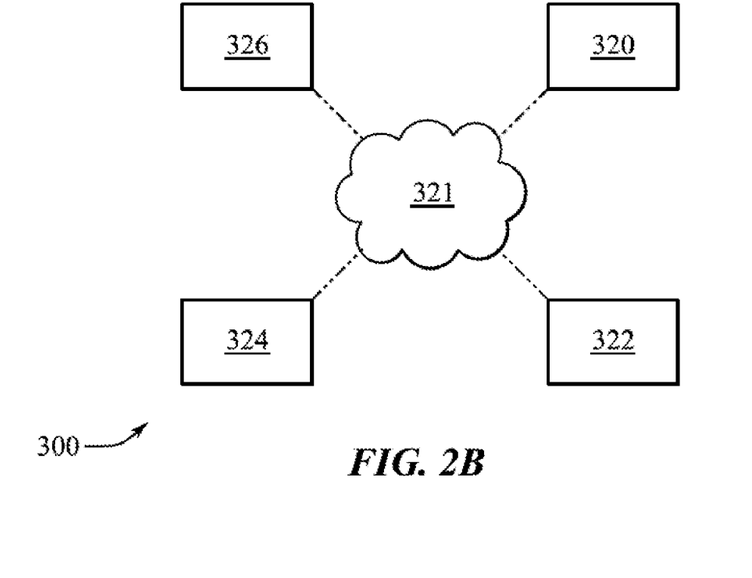
FIG. 2B shows a diagrammatic view of another system for sound localization.

FIG. 2B shows a diagrammatic view of another system 300 for sound localization, as described herein. In this example, the system 300 can include one or more electronic devices 320, 322, 324, 326, one of more of which can include an audio sensor or sensors as described herein. In some examples, one or more of the devices 320, 322, 324, 326 can be in communication with, and/or connected to, a network 321. In some examples, the devices 320, 322, 324, 326 can be connected to the network 321 through a cellular connection, a WI-FI connection, a wired connection, other forms of connections, or combinations thereof. In some examples, the devices 320, 322, 324, 326 can locally store, process, and/or analyze audio signals detected by the audio sensor or sensors, and can then transmit this information to the network 321 for further processing, analysis, recording, storage, and/or collation. In some examples, however, one or more of the devices 320, 322, 324, 326 can transmit audio signals detected by the audio sensors to the network 321 for storage, processing, analysis, and/or any of the operations described herein.

In some examples, the network 321 can be a cloud computing network that is connected to one or more cloud computing data centers and/or platforms. In some examples, where some or all of the processing of audio signals or other information can be carried out by the network 321, the need for any of the devices 320, 322, 324, 326 to include their own processing and/or storage capabilities can be reduced. Accordingly, any of the devices 320, 322, 324, 326 can have a relatively small, light, inexpensive, and/or portable form factor that can allow for a wide distribution of the devices 320, 322, 324, 326 throughout the physical space of a house containing the devices 320, 322, 324, 326.

For example, any of the devices 320, 322, 324, 326 can include a device including an electrical plug to plug into a standard electrical outlet of a house, an audio sensor, and a wireless transmitter to communicate with the network 321. In some examples, such a device can maintain the operability or use of the electrical outlet even when it is plugged in, thereby enabling a user to place many of the devices 320, 322, 324, 326 throughout the home in a variety of rooms without any reduction in the number of electrical outlets available for use by other devices. In some examples, any of the devices 320, 322, 324, 326 can include a portable power supply and/or a battery to allow the device to communicate with the network 321 without being connected to an external power source. Accordingly, one or more of the devices 320, 322, 324, 326 can be portable. Any of the devices 320, 322, 324, 326 can be moved to different physical locations in the house, can be carried by a user, and/or can be worn by a user to be moved to different physical locations, in some instances with the user.

In some examples, and as described herein, any of the devices 22, 222, 224, 226, 320, 322, 324, 326 described with respect to FIGS. 2A and 2B can include any form of electronic device including an audio sensor, such as a microphone. For example, any of the devices 22, 222, 224, 226, 320, 322, 324, 326 can include a smartphone, a wearable device such as a smartwatch, a computer, a tablet, a smart speaker, a smart television, an audio sensing device, a smart appliance, or any other electronic device. Additionally, although FIGS. 2A and 2B reference examples including four electronic devices, the systems 200 and 300 can include any number of devices. For example, the systems 200, 300 can include at least 1 device, at least 2 devices, at least 5 devices, at least 10 devices, or even more.

Figure 3A:
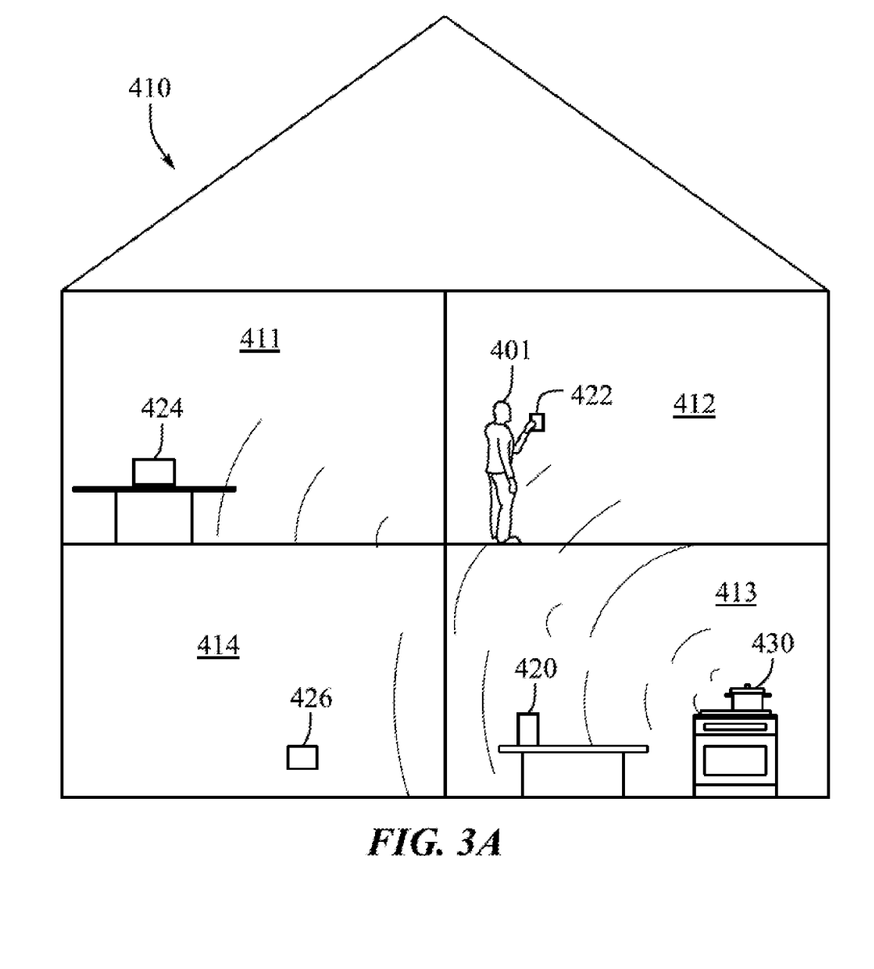
FIG. 3A shows a cross-sectional schematic view of a house including a system for sound localization.

FIG. 3A shows a cross-sectional schematic view of a space, building, domicile, or house 410, including a system for sound localization disposed therein. The house 410 can be similar to the house 110 described with respect to FIGS. 1A and 1B. In some examples, the system for sound localization can be substantially similar to, and can include some or all of the features of the systems for sound localization described herein, including systems 200 and 300 described with respect to FIGS. 2A and 2B. In the present example, the system can include a first electronic device 420, a second electronic device 422, a third electronic device 424, and a fourth electronic device 426. In some examples, however, the system may only include one device, or may include additional devices.

As shown in FIG. 3A, the first device 420 can be located in a room 413 of the house 410, such as the kitchen. In this example, the first device 420 can include a smart speaker or another similar device that can be positioned at a relatively stationary location during use, such as on the kitchen table. In some examples, the second device 422 can include a smartphone or a wearable device, such as a smartwatch, that can be carried by a user from location to location. Accordingly, the device 422 can be located in a room 412, for example a bedroom, when the user 401 is present in the room 412, and the device 422 can travel with the user 401 to another location or room of the house 410 when the user does so. In some examples, the device 422 can determine when it is present on or near the user, and can communicate this information to the system. In some examples, the third electronic device 424 can be a computer, such as laptop or a desktop computer that can be positioned in a room 411, for example, an office of the house 410. The device 426, meanwhile, can include a passive audio sensing device. The passive audio sensing device 426 can be plugged into an electrical outlet in a room 414, such as the living room.

The scenario illustrated in FIG. 3A can be substantially similar to the scenario depicted in FIG. 1A, although it should be understood that this is just one possible scenario and substantially any sound or noise that can be detected and localized by a sound localization as described herein. In this example, an object 430 in a different location than the user 401, such as a boiling pot 430 located in the kitchen 413, may make a sound, here illustrated with curved lines, that is heard by the user 401 in the office 411. In some examples, however, it may not be necessary for the user 401 to be in a different room, and/or for the user 401 to hear the sound made by the object 430 for any of the processes described herein to be initiated and/or carried out by the system for sound localization.

The location of origin and/or source of the sound may not be readily apparent to the user 141. The system for sound localization, including one or more of the electronic devices 420, 422, 424, 426 can detect the sound with one or more audio sensors, as described herein. In this particular example, the audio sensors of each of the device 420, 422, 424, 426 can detect the sound caused by the object 430. In some examples, the system including the devices 420, 422, 424, 426 can determine a location of origin of the sound by detecting and/or determining differences between the times when each of the devices 420, 422, 424, 426 detected the sound. Accordingly, a distance of the location of origin of the sound from the devices 420, 422, 424, 426 can be determined by the system, for example, by triangulation between two or more of the device 420, 422, 424, 426. Thus, by determining and/or comparing the distance of the location of origin of the sound, the system can determine a location in the house 410 of the object 430. In some examples, the system can determine the location of origin of the sound as a specific room in the house, and/or as a distance and direction relative to one or more of the devices 420, 422, 424, 426. In some examples, the distance and direction of the location of origin of the sound relative to the one or more devices 420, 422, 424, 426 can be determined in spherical coordinates, with the point of origin located at any location or locations, as desired, including at the one or more devices 420, 422, 424, 426. Once the system has determined the location of origin of the sound, the system can perform one or more actions, as described herein. Additional details regarding systems for sound localization are provided with reference to FIG. 3B.

Figure 3B:
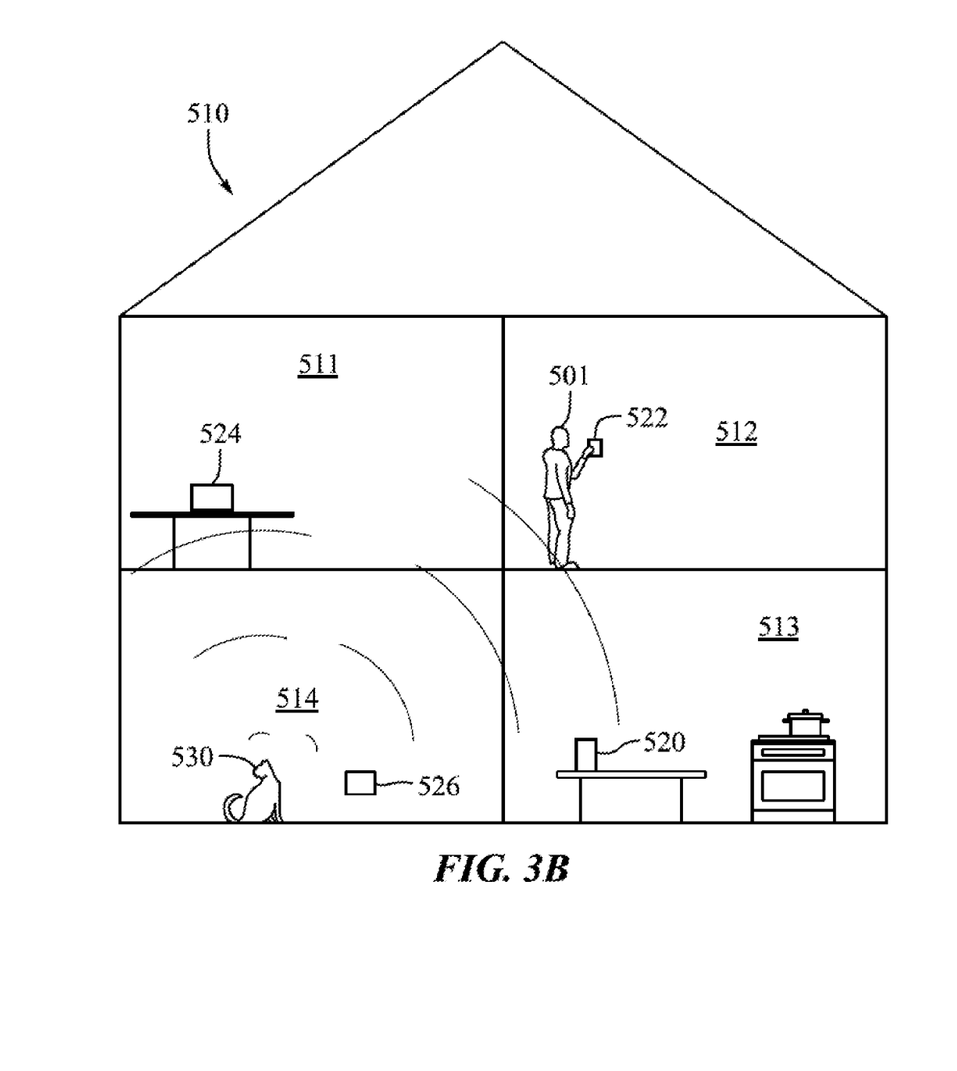
FIG. 3B shows a cross-sectional schematic view of a house including a system for sound localization.

FIG. 3B shows a cross-sectional schematic view of a house 510 including a system for sound localization including electronic devices 520, 522, 524, 526. The house 510 can be similar to the house 410 described with respect to FIG. 3A. In some examples, the system for sound localization can be substantially similar to, and can include some or all of the features of the systems for sound localization described herein, including the system illustrated in FIG. 3A. As with the scenario illustrated in FIG. 1B, the user 501 can be in a room 512, while an unknown sound can have a location of origin in a different room 514. In the present example, the sound can be made by a pet, such as cat 530, although this may not be readily apparent to the user 501.

As described with respect to FIG. 3A, the system for sound localization can detect the sound, for example, through one or more microphones or audio sensors of the electronic devices 520, 522, 524, 526, and can determine the location of origin of the sound. In addition to detecting the sound with one or more of the devices 520, 522, 524, 526 and determining the location of origin as described with respect to FIG. 3A, the system illustrated in FIG. 3B can know, understand, and/or have previously received or detected other information regarding the house 510, including information regarding each of the rooms 511, 512, 13, 514 and/or any objects located in any of the rooms 511, 512, 13, 514.

For example, the system can receive, detect, and/or store information regarding the layout or geometry of the house 510 and/or the rooms 511, 512, 13, 514. In some examples, one or more of the devices 520, 522, 524, 526 can include a sensor or sensors that can receive information related to the three-dimensional geometry of the room, including a LIDAR sensor, optical camera, infrared camera, radar sensor, other sensors that can receive two-dimensional and/or three-dimensional image information, or combinations thereof. In some examples, any of the devices 520, 522, 524, 526 can passively receive information related to the geometry of the house 510 and/or the rooms 511, 512, 13, 514 during operation. In some examples, any of the devices 520, 522, 524, 526 can receive information related to the geometry of the house 510 and/or the rooms 511, 512, 13, 514 during an active information gathering operation that can be executed by the devices and/or the user. For example, the user 501 can be prompted to travel to each of the rooms 511, 512, 13, 514 with the device 522, which can include a LIDAR sensor and/or optical camera. The user 501 can then operate the device 522 such that the device can detect the three-dimensional layout of the rooms 511, 512, 13, 514. The system for sound localization can utilize other processes, sensors, and/or methods for detecting and/or determining a layout or geometry of the house 510 and/or the rooms 511, 512, 13, 514, as desired.

In some examples, the system can use this information to build a model of the house 510 and/or the rooms 511, 512, 13, 514 that can be stored in the memory of the system, such as on one or more of the devices 520, 522, 524, 526, and/or in a storage device in communication with the system. In some examples, the model can be a two dimensional or three dimensional model. In some examples, the model can include information regarding the objects present in the house 510 and/or the rooms 511, 512, 13, 514, including relatively fixed or stationary objects, such as furniture, fixtures, and/or decorations, as well as moveable objects such as drawers, doors, and/or moveable chairs. In some examples, the system can utilize information received by sensors of the devices 520, 522, 524, 526 to characterize the materials of the house 510 and/or the rooms 511, 512, 13, 514, and/or the materials, relative mobility, type, and any other characteristics of the objects in the house 510 and/or the rooms 511, 512, 13, 514. In some examples, the system can characterize or flag an object as a potential noise source, and can use this information to determine not only a location of origin of a sound, but a specific object of origin of the sound.

For example, in the scenario illustrated in FIG. 3B, the system can know that a cat 530 lives in the house 510 and/or can use one or more sensors of the device 526 to determine that the cat 530 is in the room 514 at or near the determined location of origin of the sound. Accordingly, the system can determine a characteristic of the sound, such as the object of origin on the sound. As described further herein, in addition to determining the location of origin of the sound, the system can determine and/or detect one or more characteristics of the sound. In some examples, the characteristics of the sound can include a volume, a duration, an object or objects of origin, a material of origin, a time of origin, a time sequence or variation of the sound intensity, frequencies of the sound, and any other desired characteristics.

Any number or variety of components or devices in any configuration can be included in the systems for sound localization described herein. The systems, methods, and devices can include any combination of the features described herein, can be arranged in any of the various ways described herein, and can be performed or operated in any order, with some or all of any process steps carried out sequentially or in parallel. The structure, devices, steps, and processes of the systems and methods for sound localization described herein, as well as the concepts regarding characterization of sounds, can apply not only to the specific examples discussed herein, but to any number of embodiments in any combination. Various examples of systems for sound localization and/or characterization are described below, with reference to FIG. 4.

Figure 4:
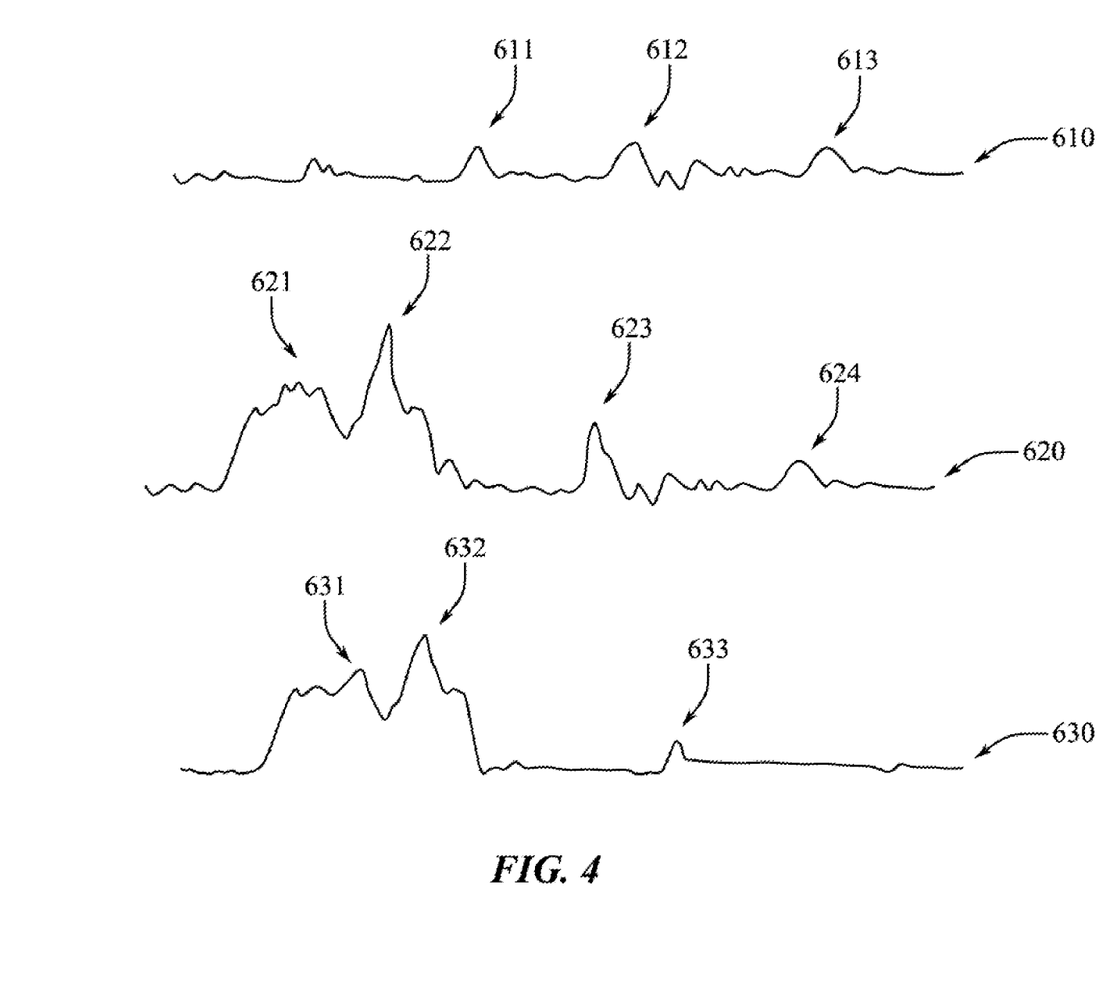
FIG. 4 shows waveforms of sounds.

FIG. 4 shows examples of audio signals 610, 620, 630 that can correspond to one or more sounds as may be detected and/or recorded by the electronic devices of a system for sound localization, as described herein. In some examples, a system for sound localization can record or determine a baseline sound profile 610 of an environment, building, domicile, house, automobile, and/or any other space. In some examples, this baseline sound profile 610 can be an expected baseline sound profile or baseline sound environment of a space containing the system for sound localization.

In some examples, the system can detect and/or record signals from one or more audio sensors of the system to build a model expected baseline sound profile or environment 610.

The baseline sound profile 610, shown as a single waveform in FIG. 4 for schematic purposes, can include sounds 611, 612, 613 that can be associated with regular and/or expected events in the environment of the system for sound localization. For example, based on monitoring and/or recording of the environment, the system for sound localization can determine that a user typically opens a door of the house at a certain time of day, this event producing an audio signature that can correspond to peak 611. Accordingly, subsequent to determining an expected sound profile including the peak 611, the system for sound localization can monitor the environment for deviations or differences from the expected sound profile 610, while essentially ignoring expected sounds, such as sound 611.

Waveform 620 is an example of one or more audio signals that can correspond to the sounds of an environment detected and/or recorded by the audio sensors of a system for sound localization, as described herein. The audio signal 620 can be a combination or summation of a baseline sound profile 610, and an unexpected sound 630 that can be located by the system. In operation, the system can detect and/or record the audio signal 620 and can compare this detected signal 620 with the expected baseline sound profile 610 to determine the location of origin and/or other characteristics of the sound 630. In some examples, this comparison can include subtracting or removing the expected baseline sound profile 610 from the audio signal 620.

As can be seen, the audio signal 620 can include a number of peaks 621, 622, 623, 624. By comparing the signal 620 to the expected baseline sound profile 610, the system can determine which peaks or features of the signal 620 are expected, that is, present on the expected baseline sound profile 610, and which may deviate from the expected baseline sound profile 610. In some examples, this comparison process can result in a signal 630 that can include only those peaks 631, 632, 633 that are not associated with the expected baseline sound profile 610. For example, peaks 631 and 632 can correspond to peaks 621 and 622. In some examples, the signal 620 can include a peak 623 that may overlap with a peak 612 of the expected baseline sound profile 610, but may have a higher intensity, different frequency or frequencies, different duration, and/or any other different characteristics. The level of the expected peak 612 can be subtracted or removed from the peak 623 to produce a differential peak 633 that can correspond to a sound to be localized. Additionally, as shown, the peak 624 can be completely removed or ignored because it corresponds to expected peak 613. The resultant signal 630 can then be analyzed or subjected to one or more steps or processes, as described herein, to determine a location of origin and/or other characteristics of the sound.

In some examples, a system for sound localization can use information in addition to audio information detected by the audio sensors to build or determine an expected baseline sound profile. In some examples, information related to the physical space being monitored can be used to determine an expected baseline sound profile, including a floor plan, elevation information, and/or the architecture or geometry of the space. In some examples, information related to the materials including the space can be used, including by analyzing images of the space to make such a determination. For example, the system can receive image information regarding a room in a house including the system, and can determine that chairs in the room are made of a specific material or materials, such as wood. This information, along with information related to acoustic information about wood, can then be used in determining an expected baseline sound profile.

Additionally, the geospatial location of the system can be used to determine an expected baseline sound profile. For example, the system can determine its geographical location and use this information to determine that certain bird songs can be included in an expected baseline sound profile. Other information can also be used, including calendar or appointment information for users or residents of a house including the system, the location or presence of users, humans, and/or pets, information related to expected events, such as package deliveries, and any other information, as desired.

In some examples, once an expected baseline sound profile has been determined, a system for sound localization can monitor and/or record audio signals from its environment to detect deviations from the expected baseline sound profile by comparing the detected signals to the expected baseline sound profile. In some examples, while the system is monitoring or determining deviations from the expected baseline sound profile, the system can also continue to receive information regarding the expected baseline sound profile and can update or revise the expected baseline sound profile. Accordingly, deviations from the expected baseline sound profile can be used to inform or revise the expected baseline sound profile and to improve the accuracy and/or sensitivity of the system over time.

For example, the expected baseline sound profile can include sounds caused by appliances of the house, such as a water heater or HVAC system. By comparing the detected sound or sounds to an expected baseline sound profile that includes sounds caused by appliances, the system can determine or monitor for irregularities or changes in the performance of any of those appliances, even when such changes may not be readily detectable by human hearing or observation.

Any number or variety of components or devices in any configuration can be included in the systems for sound localization described herein. The systems, methods, and devices can include any combination of the features described herein, can be arranged in any of the various ways described herein, and can be performed or operated in any order, with some or all of any process steps carried out sequentially or in parallel. The structure, devices, steps, and processes of the systems and methods for sound localization described herein, as well as the concepts regarding characterization of sounds, can apply not only to the specific examples discussed herein, but to any number of embodiments in any combination. Various examples of systems for sound localization and/or characterization are described below, with reference to FIGS. 5-6.

Figure 5:
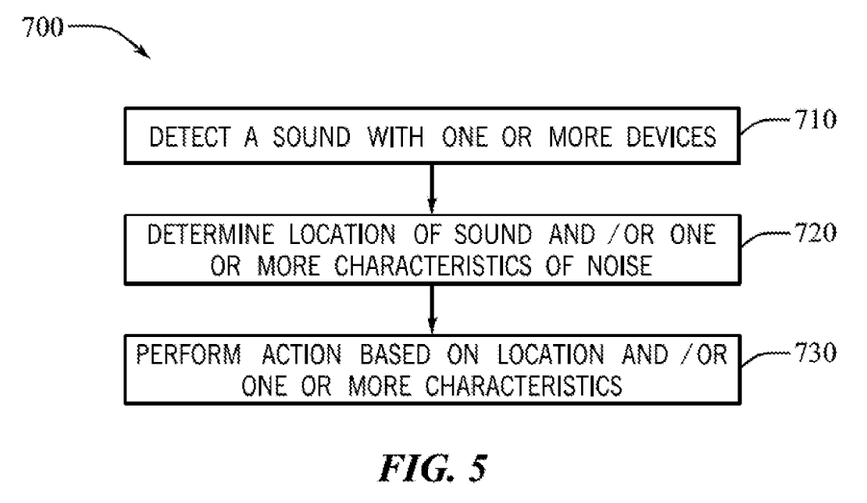
FIG. 5 shows a process flow diagram for determining a location and/or other characteristics of a sound.

FIG. 5 shows a process flow diagram for a method 700 for determining a location and/or one or more characteristics of a sound, for example, as carried out by a system for sound localization, as described herein. The method 700 can include detecting a sound with one or more devices of the system at block 710, determining the location of the sound and/or one or more characteristics of the sound at block 720, and performing an action based on the determined location and/or characteristics at block 730.

At block 710, a system for sound localization, such as those described herein, can detect a sound through one or more electronic devices of the system. In some examples, the sound can be detected by one or more audio sensors, such as microphones, of the device or devices. In some examples, the sound can be detected by a first electronic device of the system that includes multiple devices. In some examples, the sound can be detected by a first electronic device of a system, and at least a second electronic device of the system. Accordingly, in some examples, the sound can be detected by a first microphone of the first device and at least a second microphone of the second device.

At block 720, the system can determine the location of origin of the detected sound and/or one or more characteristics of the detected sound. In some examples, the audio sensor or sensors of the electronic devices of the system, such as a first electronic device and a second electronic device, can send signals corresponding to the detected sound to a processor of the system. The processor can receive a signal or signals from the devices of the system, and can determine the location of origin of the sound based at least in part on the signals from the devices, for example, according to any of the techniques or processes described herein, including through one or more machine learning algorithms.

In some examples, the processor can be disposed in an internal volume of an electronic device of the system, as described herein, including in an electronic device that includes an audio sensor. In some examples, the processor can be one or more processors associate with a cloud computing data center and/or platform that can be in wireless communication with the audio sensor or sensors of the devices of the system, as described herein.

In some examples, the system can additionally or alternatively determine one or more characteristics of the detected sound based at least in part on the signals received by the processor from one or more of the electronic devices of the system. In some examples, the system can determine one or more characteristics of the detected sound according to any of the techniques or processes described herein, including through one or more machine learning algorithms. In some examples, a determined characteristic of the sound can include an object and/or material of origin of the sound; a volume of the sound; a duration of the sound; a periodicity or time dependence of the sound; a classification of the sound in any number of categories, such as human-made, natural, or object-made; a frequency range of the sound; a time of the occurrence of the sound; and/or any other desired characteristic.

In some examples, determining a characteristic of the sound can include determining whether a characteristic of the sound satisfies a given or predicted condition or threshold. For example, determining a characteristic of the sound can include determining if a volume or amplitude of the sound is above a threshold volume or amplitude. In some examples, the condition can be a frequency envelope, a duration, a specific class of materials or objects of origin, or any other condition or combination of conditions.

At block 730, the system for sound localization can perform one or more actions based, at least in part, on the determined location and/or characteristics of the detected sound. That is, in some examples, a processor of the system can provide instructions in the form of one or more signals to cause one or more electronic devices to perform a desired action or set of actions. In some examples, the action can include notifying a user of the location or origin, and/or characteristics of the detected sound. For example, a processor of the system can provide a signal to an electronic device, such as a user's smartphone, to cause the smartphone to notify the user of the location of origin of the sound.

In some examples, performing the action can include prompting a user that a sound was detected and providing the user with an option to access information about the sound, such as the location of origin and/or characteristics, if the user so desired. In some examples, performing an action can include recording or storing information about the sound such as the location of origin and/or characteristics. For example, so that the information can be accessed by the user if the user so desires. That is, in some examples, the system can wait for a prompt from a user before providing a notification or information to the user, including information about the detected sound. In some examples, different notification or actions can be undertaken or provided based upon different detected locations and/or characteristics of the detected sound.

For example, the system can provide a notification to a user if the determined location or characteristic of the sound satisfies a first condition, and can merely store this information to be accessed by the user at the user's leisure if the determined location or characteristic of the sound satisfies a second condition but not the first condition—for example, if the volume of the sound exceeds a first volume level (second condition) but not a second higher volume (first condition). In some examples, performing the action can include instructing one or more electronic devices, either devices of the system or devices merely in communication with the system, such as smart appliances, to perform one or more actions or operations.

In some examples, performing an action can include notifying emergency or security services. In some examples, performing an action can include soliciting feedback from a user about the detected sound and/or determined location of origin and characteristics of the sound. For example, the system can determine a location of origin of the sound, and performing the action can include asking the user to confirm that the location of origin was accurate. In some examples, performing the action can include any number and/or combination of any of the actions described herein. Further details regarding methods and processes for determining the location of origin and/or other characteristics of detected sounds are described below with reference to FIG. 6.

Figure 6:
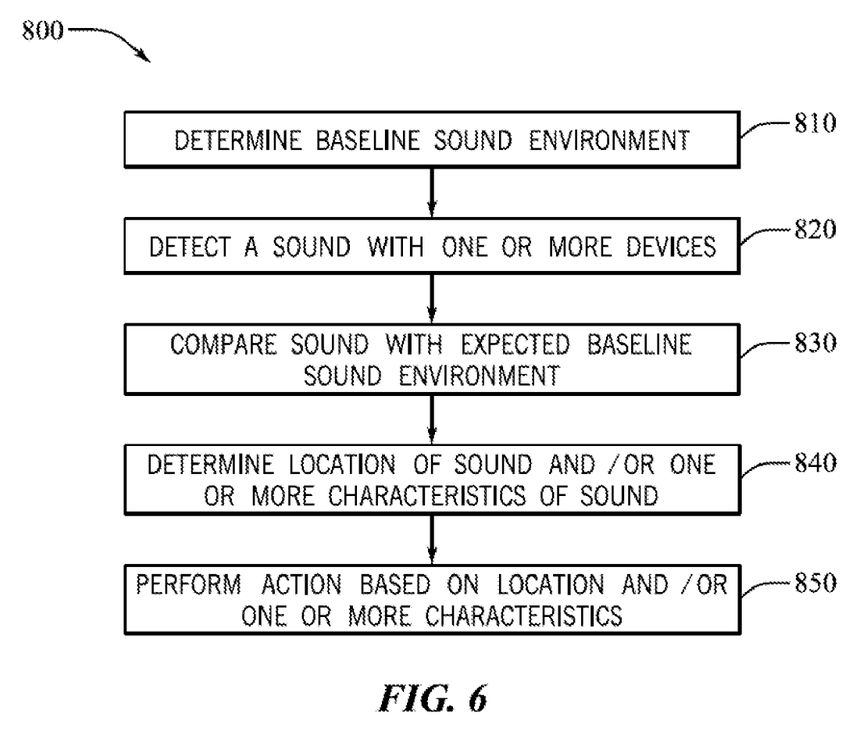
FIG. 6 shows a process flow diagram for determining a location and/or other characteristics of a sound.

FIG. 6 shows a process flow diagram for a method 800 for determining a location and/or one or more characteristics of a sound, for example, as carried out by a system for sound localization as described herein. The method 800 can include determining a baseline sound profile at block 810, detecting a sound with one or more devices of the system at block 820, comparing the detected sound with the baseline sound profile at block 830, determining the location of the sound and/or one or more characteristics of block 840, and performing an action based on the determined location and/or characteristics at block 850.

At block 810, a system for sound localization can determine a baseline sound profile of a building or environment in which the system, or some or all of the devices of the system, are located. The system can determine the baseline sound profile according to any of the techniques or processes described herein. For example, the system can determine the baseline sound profile as described with respect to FIG. 4. In some examples, the system can utilize one or more machine learning algorithms to determine the baseline sound profile, which can also be referred to as the expected or predicted baseline sound profile.

At block 820 the system for sound localization, as described herein, can detect a sound through one or more electronic devices of the system. In some examples, the sound can be detected by one or more audio sensors of the device or devices, such as microphones. In some examples, the sound can be detected by a first electronic device of the system that includes multiple devices. In some examples, the sound can be detected by a first electronic device of a system and at least a second electronic device of the system. Accordingly, in some examples, the sound can be detected by a first microphone of the first device and at least a second microphone associated with the second device.

At block 830, the system can compare the detected sound, and/or one or more signals corresponding to the detected sound to the baseline sound profile. In some examples, this comparison can be carried out according to any of the processes or techniques described herein, including with respect to FIG. 4. In some examples, comparing the detected sound to the baseline sound profile can include subtracting or removing the expected baseline sound profile from the audio signal associated with the detected sound. In some examples, comparing the detected sound to the baseline sound profile can include determining a difference between a signal or signals corresponding to the detected and the baseline sound profile. In some examples, one or more machine learning algorithms can be used to perform some or all of the comparison of block 830.

At block 840, the system can determine the location of origin of the detected sound and/or one or more characteristics of the detected sound based, at least in part, on the comparison between the detected sound and the baseline sound profile of block 830. In some examples, a processor can receive a signal or signals from the devices of the system, and can determine the location of origin of the sound based, at least in part, on differences between the signals and the baseline sound profile, for example, as described with respect to FIG. 4. In some examples, the system can determine the location of origin of the detected sound and/or one or more characteristics of the detected sound, according to any of the techniques or processes described herein, including through one or more machine learning algorithms.

Any number or variety of components or devices in any configuration can be included in the systems for sound localization described herein. The systems, methods, and devices can include any combination of the features described herein, can be arranged in any of the various ways described herein, and can be performed or operated in any order, with some or all of any process steps carried out sequentially or in parallel. The structure, devices, steps, and processes of the systems and methods for sound localization described herein, as well as the concepts regarding characterization of sounds, can apply not only to the specific examples discussed herein, but to any number of embodiments in any combination. Various examples of systems for sound localization and/or characterization are described below, with reference to FIG. 7.

Figure 7:
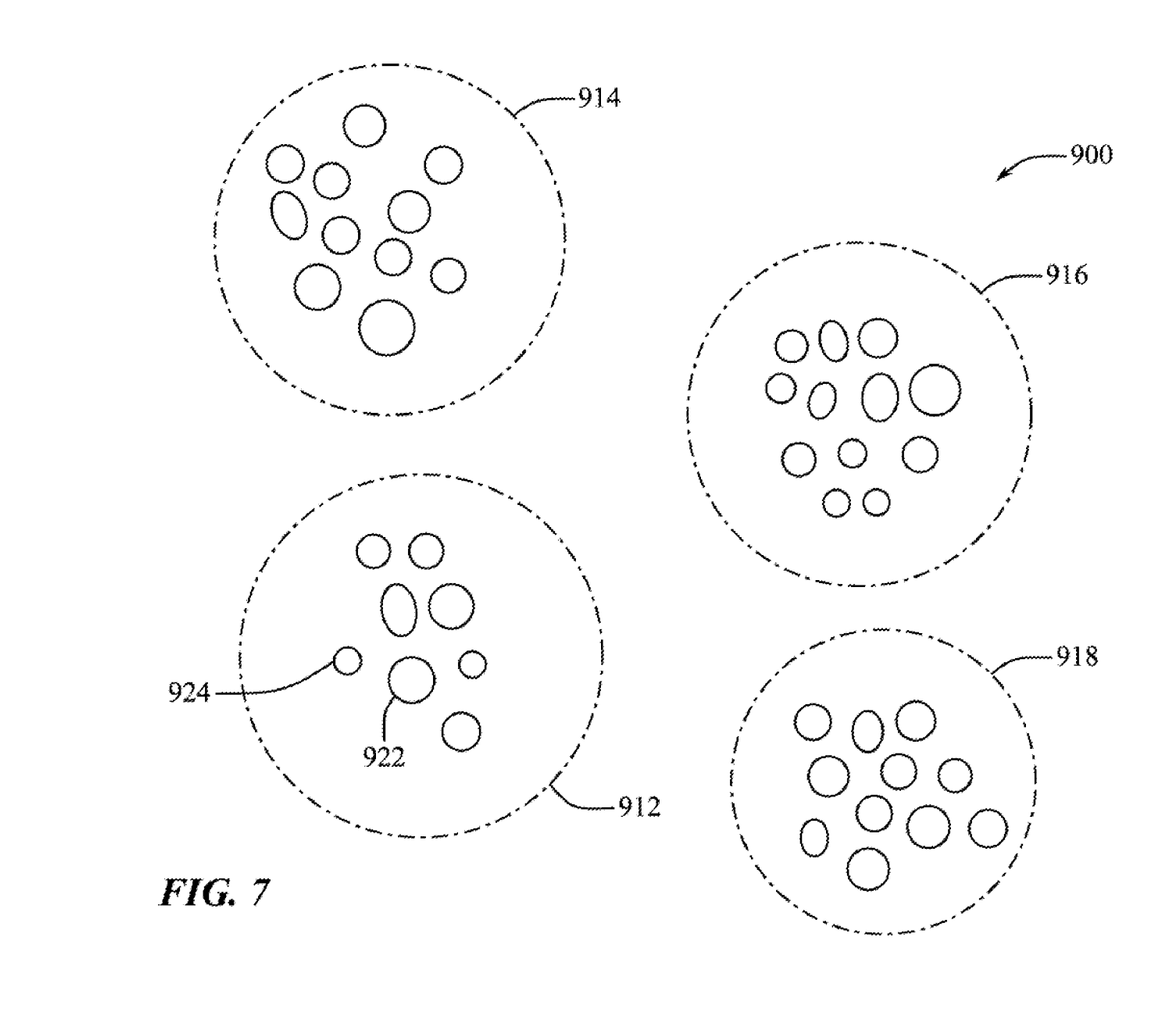
FIG. 7 shows a schematic diagram of a machine learning system.

FIG. 7 shows a schematic diagram of a machine learning system 900 that can be used by a system for sound localization to carry-out or perform any of the detections, determinations, or other processes or techniques described herein. The schematic shown in FIG. 7 can be a visual representation of how a machine learning system 900 can, for example, determine a characteristic of a detected sound, as described herein.

In the present example, waveforms, audio signals, and/or sounds detected and recorded by the system are illustrated as shapes that can be relationally grouped together by the machine learning system 900. For example, shape 922 can be associated with a first detected sound and shape 924 can be associated with a second detected sound. These sounds can be grouped together into relational categories or clusters 912, 914, 916, 918. The clusters 912, 914, 916, 918 can correspond to various features or properties of the audio signals associated or corresponding to the detected sounds, and may also correspond to one or more various characteristics of the detected sounds, as described herein.

For example, the machine learning algorithm can group sounds 922 and 924 into a cluster 912 based on a similarity between the raw audio signals associated with each detected sound. This process of grouping can be conducted multiple times to form a relational database of sounds. Further, a single sound can be grouped into multiple different clusters, relations, or networks. In some examples, the machine learning system can form or generate clusters 912, 914, 916, 918 based on training data, or audio signals that are sent to the machine learning system 900 in addition to audio signals that are organically detected by the system.

In operation, once the clusters 912, 914, 916, 918 have been formed, the system 900 can then label or associate one or more of the clusters 912, 914, 916, 918 with one or more various characteristics, as described herein. For example, the cluster 912 can include detected sounds having certain similar features, such as similarly shaped waveforms. After the grouping of the sounds has occurred, the system 900 can then associate the cluster 912 with the characteristic of sounds that are caused by wooden objects. In some examples, this association can be carried out based, at least in part, on user input to the system 900. That is, a user can indicate to the system 900 that the sound 922 was caused by a wooden object and the system 900 can then assign the relevant label to the cluster 912 containing the sound 922. In this way, the system 900 can then make the determination that the sound 924 was likely also caused by a wooden object. In some examples, the system 900 can alternatively or additionally utilize other information associated with the detected sounds, such as sound 922, to assign a relevant label or characteristic to the cluster.

For example, the system 900 can use preprogrammed label information, learned information, information provided to the system 900 as an update, information learned by other systems, for example other systems for sound localization that are in operation in other environments or locations, by operating in a training mode, where a user or other party deliberately produces sounds, or any combination of these or other techniques.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A system for sound localization, the system comprising:
   a first electronic device comprising a microphone configured to detect a sound;
   a second electronic device;
   a processor in communication with the first electronic device and in communication with the second electronic device, the processor configured to:
      receive a first signal from the first electronic device corresponding to the detected sound;
      determine a location of origin of the detected sound based at least in part on the first signal; and
      provide a second signal to the second electronic device in response to detecting the sound, the second signal based at least in part on the location of origin, the second electronic device configured to notify a user of the determined location of origin of the detected sound in response to receiving the second signal from the processor.

2. The system of claim 1, wherein the processor is disposed in an internal volume defined by the first electronic device.

3. The system of claim 1, wherein the second electronic device is configured to notify a user of a characteristic of the detected sound.

4. The system of claim 3, wherein the second electronic device comprises a smartphone, a wearable device, a computer, a tablet, or a smart speaker.

5. The system of claim 1, wherein:
   the microphone comprises a first microphone;
   the second electronic device comprises a second microphone configured to detect the sound; and
   the processor is further configured to:
      receive a third signal from the second electronic device corresponding to the detected sound; and
      determine the location of origin based at least in part on the first signal and the third signal.

6. The system of claim 1, wherein the processor is configured to:
   determine a characteristic of the detected sound based at least in part on the first signal; and
   provide the second signal to the second electronic device if the characteristic satisfies a condition.

7. A method for determining one or more properties of a sound, the method comprising:
   determining an expected baseline sound profile;
   detecting a sound with an electronic device;
   determining a location of origin of the sound and a characteristic of the sound, wherein determining the characteristic comprises comparing the detected sound with the expected baseline sound profile; and
   performing an action based at least in part on the location if the characteristic satisfies a condition.

8. The method of claim 7, wherein:
   the electronic device comprises a first electronic device; and
   detecting the sound comprises detecting the sound with a system that comprises the first electronic device and a second electronic device.

9. The method of claim 7, wherein the location of origin is a room in a building containing the electronic device.

10. The method of claim 7, wherein the expected baseline sound profile is determined at least in part by a machine learning algorithm.

11. The method of claim 7, wherein the characteristic comprises a material of origin of the sound.

12. The method of claim 11, wherein the condition comprises whether the material of origin is on a list of expected materials of origin.

13. The method of claim 7, wherein the characteristic comprises an object of origin of the sound.

14. The method of claim 7, wherein the characteristic comprises a volume of the sound and the condition comprises whether the volume is above a threshold volume.

15. The method of claim 7, wherein the action comprises notifying a user of the location of origin.

16. The method of claim 7, wherein the action comprises recording the detected sound, the location of origin, and the characteristic.

17. An audio system, comprising:
   a microphone configured to detect a sound; and
   a processor in communication with the microphone, the processor being configured to:
      receive a signal from the microphone corresponding to the detected sound;
      compare the signal to a baseline sound profile;
      determine a characteristic of the detected sound by comparing the detected sound with the baseline sound profile;
      determine a location of origin of the detected sound based at least in part on the signal; and
      perform an action based at least in part on the characteristic satisfying a condition.

18. The audio system of claim 17, wherein the microphone and the processor are disposed in an internal volume of an electronic device.

19. The audio system of claim 17, wherein:
   the microphone is disposed in an internal volume of a first electronic device;
   the processor is disposed in an internal volume of a second electronic device; and
   the processor is in wireless communication with the microphone.

20. The audio system of claim 17, wherein performing the action comprises providing a notification to a user if a detected volume of the sound is above a threshold volume.

\* \* \* \* \*

UNITED STATES PATENT AND TRADEMARK OFFICE
CERTIFICATE OF CORRECTION

| | | |
|---|---|---|
| PATENT NO. | : 11,582,554 B1 | Page 1 of 1 |
| APPLICATION NO. | : 17/211582 | |
| DATED | : February 14, 2023 | |
| INVENTOR(S) | : Paul G. Puskarich et al. | |

It is certified that error appears in the above-identified patent and that said Letters Patent is hereby corrected as shown below:

On the Title Page

Item (54) and in the Specification Column 1, Lines 1-2 Replace:
"HOME SOUND LOACALIZATION AND IDENTIFICATION"
With:
--HOME SOUND LOCALIZATION AND IDENTIFICATION--

Signed and Sealed this
Eleventh Day of March, 2025

Coke Morgan Stewart
*Acting Director of the United States Patent and Trademark Office*